Figure 1:
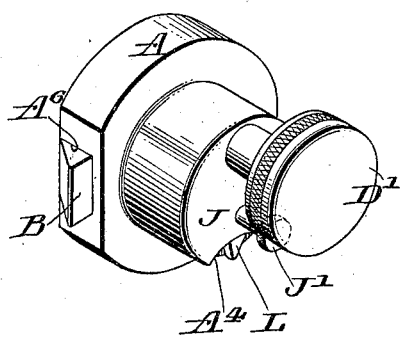

No. 745,080. PATENTED NOV. 24, 1903.
O. SMITH.
PERMUTATION LOCK.
APPLICATION FILED APR. 3, 1902. RENEWED OCT. 15, 1903.
NO MODEL. 5 SHEETS—SHEET 1.

WITNESSES:

INVENTOR:
Oberlin Smith
by his atty.

No. 745,080. PATENTED NOV. 24, 1903.
O. SMITH.
PERMUTATION LOCK.
APPLICATION FILED APR. 3, 1902. RENEWED OCT. 15, 1903.
NO MODEL. 5 SHEETS—SHEET 2.
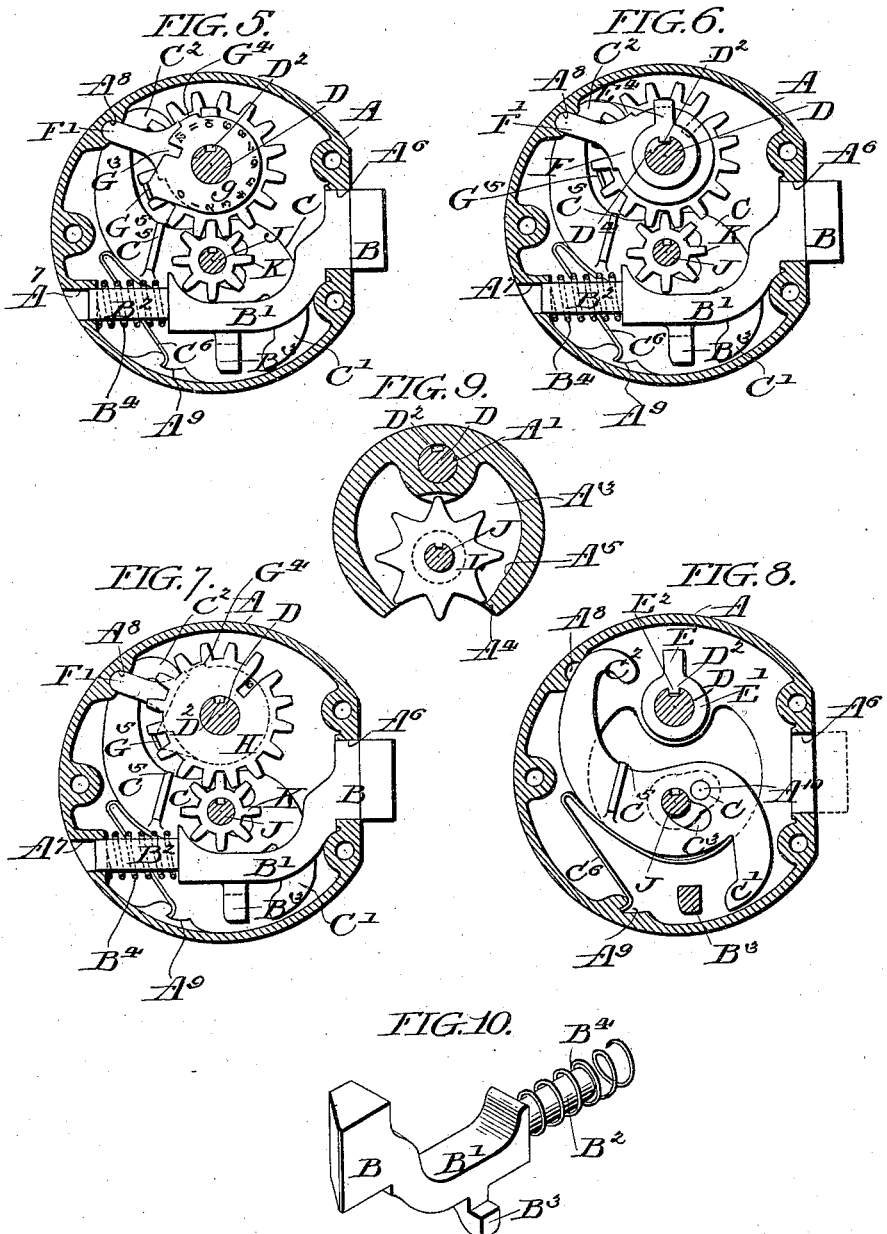

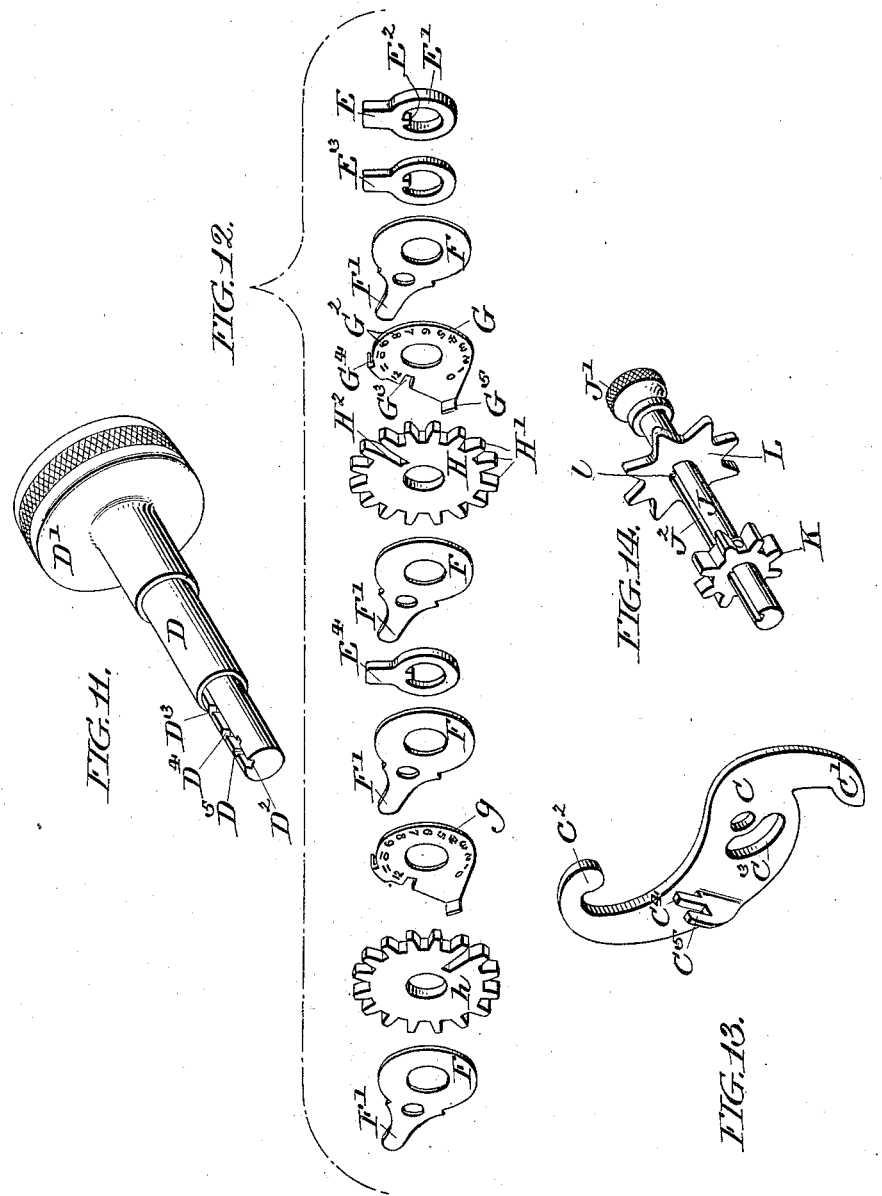

No. 745,080. PATENTED NOV. 24, 1903.
O. SMITH.
PERMUTATION LOCK.
APPLICATION FILED APR. 3, 1902. RENEWED OCT. 15, 1903.
NO MODEL. 5 SHEETS—SHEET 4.
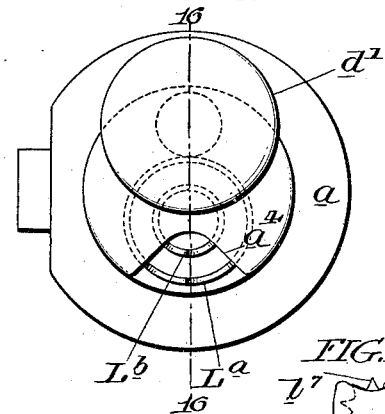
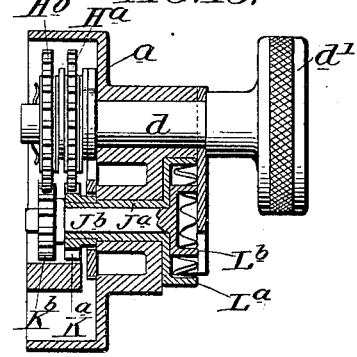
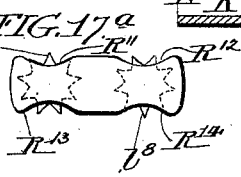
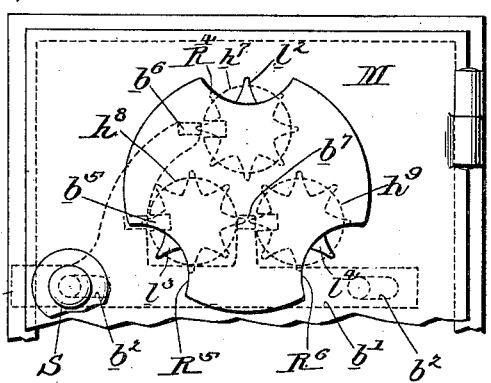
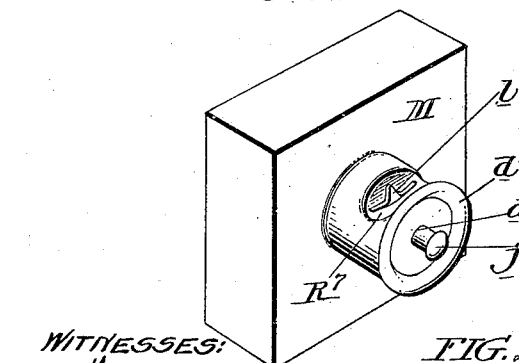
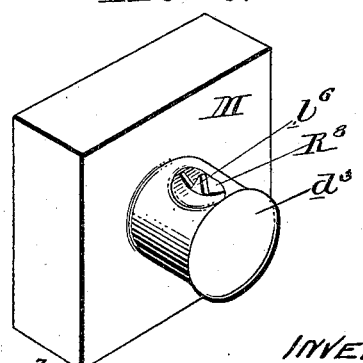
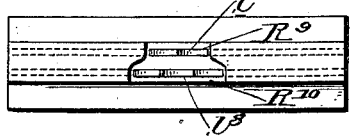
WITNESSES: INVENTOR:

No. 745,080. PATENTED NOV. 24, 1903.
O. SMITH.
PERMUTATION LOCK.
APPLICATION FILED APR. 3, 1902. RENEWED OCT. 15, 1903.
NO MODEL. 5 SHEETS—SHEET 5.

WITNESSES: INVENTOR:

No. 745,080. Patented November 24, 1903.

UNITED STATES PATENT OFFICE.

OBERLIN SMITH, OF BRIDGETON, NEW JERSEY.

PERMUTATION-LOCK.

SPECIFICATION forming part of Letters Patent No. 745,080, dated November 24, 1903.

Application filed April 3, 1902. Renewed October 15, 1903. Serial No. 177,222. (No model.)

*To all whom it may concern:*

Be it known that I, OBERLIN SMITH, a citizen of the United States of America, residing in Bridgeton, in the county of Cumberland and State of New Jersey, have invented a certain new and useful Improvement in Permutation-Locks, of which the following is a true and exact description, reference being had to the accompanying drawings, which form a part thereof.

My invention relates to permutation-locks, and is, in a broad sense, an improvement upon my invention described in my prior patent, No. 494,605, of April 4, 1893, inasmuch as I still embody and utilize the principle of giving motion to the tumblers through a device which acts upon them by a series of impulses which have simply to be counted and do not require the assistance of the eye to accurately define the extent of movement of the impelling mechanism. In my said former invention, however, the impulses were communicated to the tumblers by the action of a push-button and were accompanied by a more or less audible click, from which one acquainted with the construction and mode of operation of the lock might be able to deduce the combination.

The principal object of my present invention is to provide an impelling device which, like the push-button of my former lock, will operate by a series of impulses which do not require the aid of the eye to determine their extent, but which, unlike my former device, will be entirely free from the click or other noise by which a listener might deduce the combination.

I have further in view the general improvement and simplification of the lock and the provision for a great number of possible combinations.

The leading feature of my invention consists in providing as the actuating device for the tumblers a toothed movable part, which is preferably a star-wheel, but may be constructed as a toothed rack, and combining with such movable device a notched shield or plate through a slot in which one or more of the teeth project and which slot is so shaped as to permit the introduction of a finger for operating the toothed device, the conformation of the notch being such as to limit and regulate the extent to which the toothed device can be moved by each finger action.

Other features of my invention will be best understood as described in connection with the drawings in which they are illustrated, and in which—

Figure 2:
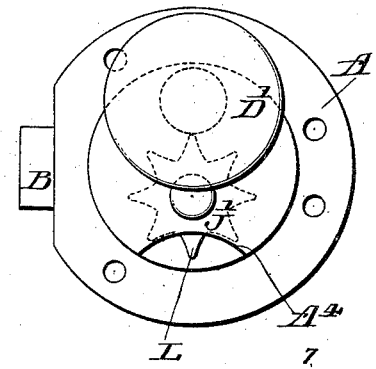
Figure 3:
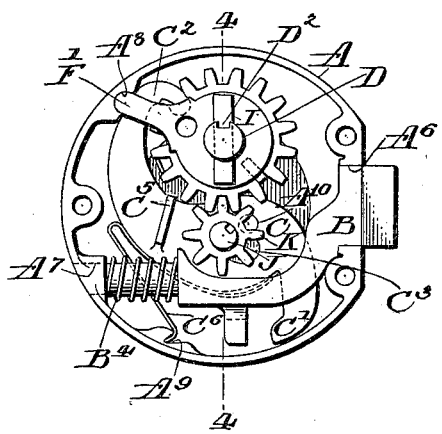
Figure 4:
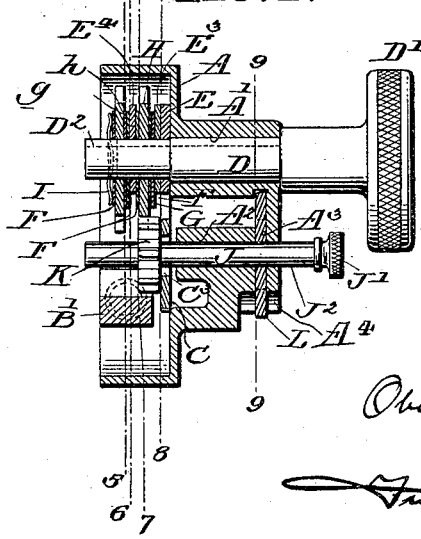
Figure 22:
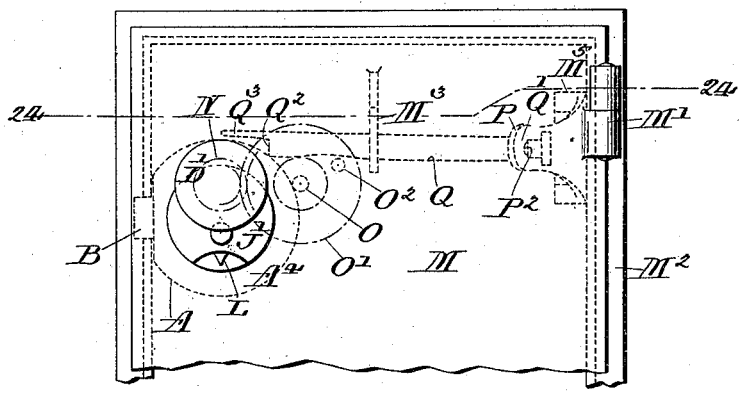
Figure 23:
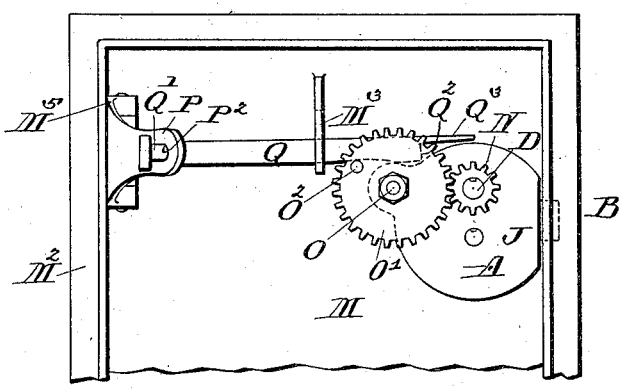

Figure 1 is a perspective view of a permutation-lock constructed in accordance with my invention. Fig. 2 is a front elevation of said lock; Fig. 3, a rear elevation of the same with the back plate of the casing removed. Fig. 4 is a vertical cross-section taken on the line 4 4 of Fig. 3; Fig. 5, a cross-section taken on the line 5 5 of Fig. 4; Fig. 6, a cross-section taken on the line 6 6 of Fig. 4; Fig. 7, a cross-section on the line 7 7 of Fig. 4; Fig. 8, a cross-section taken on the line 8 8 of Fig. 4; Fig. 9, a cross-section taken on the line 9 9 of Fig. 4. Fig. 10 is a perspective view of the locking-bolt. Fig. 11 is a perspective view of the spindle to which the locking-dogs are secured and the hand-wheel by which said spindle is actuated. Fig. 12 shows in perspective the various dogs, tumblers, &c., which are secured on the spindle shown in Fig. 11. Fig. 13 is a perspective view of a lever or bar through which the spindle acts upon the locking-bolt, and Fig. 14 is a perspective view of the star-wheel shaft, &c., by which the tumblers are set. Fig. 15 is a front elevation of a modified form of my lock; Fig. 16, a cross-section on the line 16 16 of Fig. 15. Fig. 17 is a front elevation showing another modification of my locking device. Fig. 17ª is an elevation showing a slight modification. Fig. 18 is a front elevation showing still another modification. Figs. 19 and 20 are perspective views illustrating, respectively, two additional modifications; and Fig. 21 is a front elevation showing still another modification. Fig. 22 is a front elevation of an automatic device for scattering the tumblers which I prefer to use in connection with my invention. Fig. 23 is a rear elevation of the same device; and Fig. 24 is a plan view of the said device, taken on the section-line 24 24 of Fig. 22 and illustrating its mode of operation.

Figure 24:
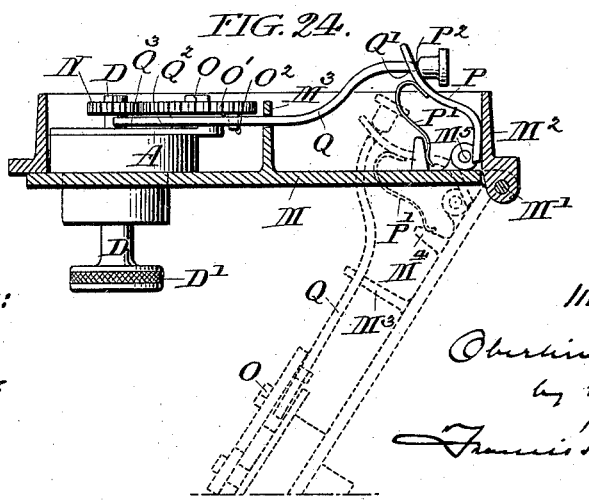

A indicates the lock-casing, which of course can be of any convenient and proper outline and construction, as shown for the lock illustrated in Figs. 1 to 14 and the same lock illustrated in Figs. 22 to 24. The front of the casing is formed with a bearing-perforation $A'$ for the spindle upon which the tumblers are secured and with another bearing-perforation $A^2$ for the shaft upon which the star-wheel-actuating device is secured. The front part of the casing is slotted, as shown at $A^3$, to form a chamber in which the star-wheel is situated, and a notch $A^4$ is formed outside of the casing, leading into the slot $A^3$, so that one or more of the teeth of the star-wheel project into the notch and within reach of the operator's finger. The construction is well illustrated in Fig. 2. The wall of the slot $A^3$, in which the star-wheel is situated, as it is formed in the particular instance under consideration, is indicated at $A^5$ in Fig. 9.

$A^6$ indicates the opening through which the locking-bolt extends.

$A^7$ (see Figs. 5, 6, and 7) is a bearing formed in the casing for the rear end of the locking-bolt.

$A^8$ is a notch-like slot used for preventing the rotation of the antifriction-plates, to be described, and $A^9$ is a notch for holding the spring.

B is the locking-bolt, having the conformation best shown in Fig. 10, the portion of the bolt in the rear of the latch itself being depressed, as indicated at $B'$, and formed with a downwardly and laterally extending projection, (indicated at $B^3$.) The extreme rear end of the bolt (indicated at $B^2$) rests in the bearing $A^7$ and is surrounded by a spring $B^4$, which acts to press the latch outward to the position shown in Figs. 5, 6, and 7.

C is a bar pivoted on a pin $A^{10}$, extending out from the casing A, having a downwardly-extending curved arm $C'$, which is adapted to come in contact with the lug $B^3$ of the bolt. The other end of the bar C is reversely curved, as indicated at $C^2$, and so shaped as to be engaged and moved toward the right by a dog secured to the spindle. The bar C is formed with a slot $C^3$, through which the shaft J extends, and is also formed with a laterally-projecting toothed lug, as indicated at $C^4$ $C^5$. The bar C is normally held in the position indicated in the different figures of the drawings by the action of a spring $C^6$.

D is the spindle, which extends through the bearing-perforation $A'$ of the casing and has attached to its outer end the hand-wheel $D'$. The inner end of the spindle is longitudinally slotted, as indicated at $D^2$, and has extending from this longitudinal slot circumferential slots (indicated at $D^3$ and $D^4$) for purposes to be described.

$D^5$ indicates a hole through the spindle, through which a cotter can be inserted.

E is a dog secured to the spindle and extending out into operative relationship with the end $C^2$ of the bar C. As shown, (see Fig. 12,) it is secured to an annular ring $E'$, which slips over the end of the shaft D and is provided with an internally-extending tooth $E^2$, which engages the slot $D^2$. This unlocking-dog moves positively with the spindle D and lies against the casing, as is well indicated in Figs. 4 and 8.

$E^3$ and $E^4$ are dogs of similar construction to the dog E, also supported on the shaft D, but having their internal teeth in registration, respectively, with the circumferential slots $D^3$ and $D^4$, which permits the shaft a certain freedom of angular movement without affecting the position of the dogs. The dog $E^3$ is placed on the spindle or shaft next to the dog E, and then in the assembly of the various devices indicated in Fig. 12 the antifriction-plate F is placed over the spindle with its tailpiece $F'$ in engagement with the notch $A^8$. The next piece to be placed on the spindle is the thin plate G, having a laterally-turned tooth $G^4$, which projects over the edge of the plate F into the path of the dog $E^3$, the plate G having also another laterally-turned tooth $G^5$, extending in the opposite direction and adapted to engage between two of the teeth of the tumbler-wheel H. The circumference of the plate G is preferably marked with a numbered scale, as indicated at $G^2$, which corresponds with the determined number of impulses to be given to the actuating devices for bringing the controlled tumbler H to unlocking position.

$G^3$ indicates a notch in the plate G, which is convenient for adjusting it.

H, as already described, is a tumbler which is slipped over the spindle D and engaged with the tooth $G^5$ of the plate G in whatever position may be determined upon, the number of impulses to be given to the tumbler being indicated by the figure on the scale which registers with the notch $H^2$. The tumbler is provided with circumferential teeth, (indicated at $H'$,) and the space between these teeth is at one point slotted out, as indicated at $H^2$. Immediately above the tumbler H another antifriction-plate F is inserted, and immediately over it the dog $E^4$ is placed, with its internal teeth in registration with the slot $D^4$. Above this dog another antifriction-plate F is placed, and above this a plate $g$, corresponding in all respects with the plate G, is placed on the spindle, and above it a second tumbler $h$ is placed on the spindle and engaged with the plate $g$. Over all is placed a fourth antifriction-plate F, and the whole assemblage on the spindle is held in place by a cotter I, (see Figs. 3 and 4,) passing through the perforation $D^5$.

J is a shaft supported in the bearing $A^2$ and having both longitudinal and rotatable movement therein. It is formed with a milled head $J'$ and with a longitudinal slot $J^2$. (See Fig. 14.) To the inner end of the shaft J is firmly secured the gear-wheel K, the teeth of which are adapted to engage with the teeth of the tumblers H $h$, and the shaft passes through and is engaged by the slot $J^2$ with a star-wheel L, situated in the slot-chamber $A^3$ and having a tooth $l$ extending into the slot $J^2$. The longitudinal movement of the shaft J is from a position shown in Fig. 4, while the gear-wheel K engages the teeth of the tumbler H to a position in which the teeth of the said gear-wheel will engage the teeth of the tumbler $h$. The withdrawal of the latch B is effected by the rotation of the shaft D, which, carrying with it the dog E, brings the said dog into contact with the under side of the curved end $C^2$ of the bar C, moving it toward the right, as shown in Fig. 8, and forcing the lower end $C'$ of the bar against the lug $B^3$ of the lock, so as to push the lock backward against the pressure of the spring $B^4$. The bar C, however, cannot be turned to unlocking position except when its locking-dogs $C^4$ and $C^5$ register with the slots $H^2$ in the tumblers H $h$, and it is necessary, therefore, that these tumblers should be turned to the position in which they will register with the dogs on the bar C before the lock can be opened, and this adjustment of the tumblers is effected by the star-wheel L on the shaft J. Thus in operation the hand-wheel D' is turned in reverse direction to that in which it turns to open the lock until it comes to a standstill with the tumblers scattered, the shaft J being, for instance, in the position shown in Fig. 4, the operator moves his finger through the notch $A^4$, engaging the projecting teeth of the wheel L and moving it as far as the notch permits. This, of course, rotates the shaft J and wheel K through a corresponding angle, and the wheel K on its engagement with the tumbler H gives to it a corresponding movement. A succession of such impulses are communicated through the star-wheel L in accordance with the setting of the tumbler H and until the slot $H^2$ in said tumbler comes into registry with the dog $C^4$ of the bar C; the shaft J is then pushed inward until the gear-wheel K engages the tumbler $h$ and then another series of impulses is communicated through the star-wheel to the tumbler $h$ until its slot $H^2$ is brought into registry with the dog $C^5$ of the bar C, the turning of the spindle D then brings the dog E into contact with the end $C^2$ of the bar C and the latch is withdrawn, as already described. It will be observed that the use of the antifriction-plates F effectually prevents the motion of one tumbler being communicated to the other and also that these antifriction-plates prevent a communication of the motion given to the tumblers to either of the dogs $E^3$ or $E^4$, and, further, these plates F, having a broad face contact with the tumblers and plates G $g$, counteract any tendency of the spindle D to move the tumblers. When it is desired to scatter the tumblers, this is effected by simply rotating the spindle D in the reverse direction, the dogs $E^3$ and $E^4$ taking up this motion when they reach the ends of the slots $D^3$ and $D^4$, and coming in contact with the projections $G^4$ of the plates G and $g$ they rotate these plates and the tumblers H and $h$, firmly attached thereto, through the angular distances provided for in the relative adjustment of the plates G and $g$ with the tumblers H and $h$. Of course the combination is scattered with the first movement of either of the tumblers; but the extent to which either tumbler can depart from the position in which it is when the lock can be opened is determined by the extent of movement given to the dogs and the point at which they come in contact with the lugs $G^4$.

It is desirable that some automatic means should be provided by which the tumblers are scattered by the act of closing the door to which the lock is attached, and this I provide for by a simple addition to my lock—such, for instance, as is shown in Figs. 22 to 24, inclusive, in which M indicates the door, hinged at M' to a framing, (indicated at $M^2$.) N is a gear-wheel secured on the end of the spindle D and in engagement with the gear-wheel of larger diameter (indicated at O') and secured on a stud-bearing O, said gear-wheel O' having projecting from its side the pin indicated at $O^2$. P is a bent lever pivoted to the inside of the door at $M^5$ and pressed backward by the action of a spring P', resting against a lug $M^4$ on the door. The position of the bent lever P is such that when the door is shut it comes in contact with the frame $M^2$, as shown in Fig. 24, and is pressed inward. The lever P is, as shown, formed with a perforation $P^2$, in which is engaged the neck Q' of a rod Q, supported on a bearing $M^3$, extending out from the back of the door and having at its end a shoulder $Q^2$ and projecting finger $Q^3$. The rod Q rests on the pin $O^2$, and when the door is opened and the lever P moves back the finger $Q^3$ drops onto the pin $O^2$, which is thus brought to a position in front of the shoulder $Q^2$ in the position which that shoulder occupies when the combination is set for opening. When, however, the door is closed, the lever P and rod Q are moved forward, the shoulder $Q^2$ pressing against the pin $O^2$ and rotating the wheel O' and through it the gear-wheel N and spindle D through a sufficient arc to effect the scattering of the tumblers, the motion of the rod Q being sufficient in extent to cause its thicker portion to ride over the pin $O^2$, which, moving downward in its arc, releases itself at the end of its forward stroke, so that it will not interfere with the resetting of the combination. Obviously the number of permutations may be greatly increased by stringing upon the shaft D more than two tumblers with their dogs and other accessories.

My improved actuating device can be used with practically any form and construction of combination-lock and is itself susceptible of embodiment in many different forms. Thus in the construction shown in Figs. 15 and 16 the spindle indicated at $d$ has journaled upon it the two tumblers $H^a$ and $H^b$, the first of which is in engagement with a gear-wheel $K^a$, secured on a sleeve-shaft $J^a$, to the outer end of which shaft is secured a star-wheel $L^a$ of somewhat different form from the one indicated at L. The tumbler H$^b$ is engaged by a gear-wheel K$^b$, secured on a shaft J$^b$, to the outer end of which is secured the star-wheel L$^b$, and, as shown in said figures, the star-wheels both project for a portion of their diameter through a slot (indicated at $a^4$) in the lock-casing. It will be obvious that by acting first upon one and then upon the other star-wheel the tumblers can be brought to unlocking position. These "stars" obviously resemble a bevel-gear rather than a spur-gear, as in the form L.

In the construction indicated in Fig. 17 two disk tumblers (indicated at $h^4 \ h^5$) are formed with notches $h^6$ and directly connected to star-wheels $l$ and $l'$, which in this case project each into two notches, (indicated at R R' and R$^2$ H$^3$,) the two notches being of different form and proportion, so that the wheels, which move to a greater or less extent, in accordance with which is used the latch, (indicated at $b$,) secured to a bar $b'$, formed with slots $b^2$, by which it is guided on convenient supporting-pins, the upper portion of the bar $b$ being provided with lugs $b^3$ $b^4$, which prevent the lock from opening except when the said lugs are in registry with the slots $h^6 \ h^6$, as shown in the drawings. The handle S is provided for actuating the lock.

In Fig. 17$^a$ a similar construction to that in Fig. 17 is shown adapted to star-wheels with an odd number of teeth. In either case the two notches allow a "differential" action, so that the tumblers can be moved to twice as many positions as there are star-teeth, because the first impulse on one side or the other is but of half the usual magnitude.

In the construction shown in Fig. 18 three tumbler-disks (indicated at $h^7$, $h^8$, and $h^9$) are provided, each directly actuated by star-wheels $l^2 \ l^3 \ l^4$, the notches into which the star-wheels project being indicated at R$^4$, R$^5$, and R$^6$, and in this case the locking-bar $b'$, generally similar to the one shown in Fig. 17, is provided with three lugs, (indicated at $b^5$ $b^6 \ b^7$.)

In Fig. 19 the star-wheel indicated at $l^5$ is secured to a shaft $j$, extending through a perforation $d^3$ in the handle $d^2$, by which the spindle supporting the dogs is actuated, the motion of the star-wheel being conveyed to the dogs by any convenient mechanism, no particular device being shown.

In Fig. 20 the star-wheel indicated at $l^6$ is also set in the spindle-handle $d^3$, but in a slightly different direction. This form is suitable for actuating rack-toothed longitudinal tumblers, as in my said Patent No. 494,605, as a substitute for the clicking-pawl.

In Fig. 21 I have indicated at $l^7$ and $l^8$ toothed racks projecting into notches R$^9$ R$^{10}$ in front of the lock-casing, the motion of the racks being communicated to the tumblers by any convenient mechanism. At R$^{10}$ the differential action is shown, according to which direction the rack is moved, to start with a half-impulse.

The above-described modifications are simply indicated to show the general extent of possible arrangements of the star-wheels, which star-wheels are toothed devices, the use of which in combination with the limiting notches and slots through which their teeth extend forms the general feature of my invention.

Having now described my invention, what I claim as new, and desire to secure by Letters Patent, is—

1. In permutation-locks, as a device for adjusting the tumblers, one or more movable parts set in front of the locking mechanism and having teeth or projections adapted to be engaged by the finger, in combination with a casing inclosing said movable parts and having formed in it a finger notch or notches into which one or more of the teeth project and by means of which said teeth and the movable parts aforesaid can be moved by the finger through a predetermined distance, and a series of impulses thus communicated to the tumblers.

2. In permutation-locks, as a device for adjusting the tumblers, one or more star-wheels set in front of the locking mechanism and having a portion projecting into a finger-notch whereby the star-wheel can be moved by the finger through a predetermined angle and a series of impulses thus communicated to the connected tumblers.

3. In permutation-locks, as a device for adjusting the tumblers, a moving part having projecting teeth adapted to be engaged by the finger to move said part in combination with a casing inclosing said moving part and having two notches formed therein into which said teeth project and which admit the finger to contact with said teeth, said notches being so arranged with reference to the teeth that the teeth project therein in relatively different positions whereby a differentiation in the motion of the moving part is effected, according as one notch or the other is used for actuating it.

4. In a permutation-lock having a plurality of toothed disk tumblers, a longitudinally-movable rotatable shaft having a toothed wheel secured to its inner end which is adapted to engage and actuate each tumbler-disk in turn as the shaft is moved in or out and a star-wheel secured to the outer end of said shaft for rotating it.

5. In a permutation-lock having a plurality of toothed disk tumblers, a longitudinally-movable rotatable shaft having a toothed wheel secured to its inner end which is adapted to engage and actuate each tumbler-disk in turn as the shaft is moved in or out in combination with a star-wheel keyed on the outer end of said shaft and a casing inclosing said star-wheel and formed with a finger-notch into which a portion of the star-wheel projects as specified.

6. The combination with a door of a permutation-lock having a spindle to which the unlocking-dog is secured and by which it is actuated, tumbler-disks journaled on said spindle, scattering-dogs connected to said spindle and arranged on its reverse movement to scatter the tumblers, and mechanism connected with the door and spindle whereby the closing of the door rotates the spindle to scatter the tumblers from "unlocked" position.

7. In a permutation-lock, the combination with a spindle as D, having scattering-dogs, as $E^3$, $E^4$, secured to it and tumbler-disks, as H $h$, journaled upon it, of plates as G $g$ having a lug $G^4$ adapted to be engaged by a scattering-dog and a lug $G^5$ adapted to engage one of the tumbler-disks.

OBERLIN SMITH.

Witnesses:
J. BINKETT WEBB,
HUGH L. REEVES.